US008567034B2

(12) United States Patent
Hofmann et al.

(10) Patent No.: US 8,567,034 B2
(45) Date of Patent: Oct. 29, 2013

(54) METHOD FOR THE PERMANENT CONNECTION OF WORKPIECES, PRESSING TOOL, AND ATTACHMENT FOR A PRESSING TOOL

(75) Inventors: Frank Hofmann, Attendorn (DE); Sudi Sinoplu, Attendorn (DE); Andreas Hütte, Attendorn (DE)

(73) Assignee: Viega GmbH & Co, KG, Attendorn (DE)

( * ) Notice: Subject to any disclaimer, the term of this patent is extended or adjusted under 35 U.S.C. 154(b) by 394 days.

(21) Appl. No.: 12/735,865

(22) PCT Filed: Jan. 30, 2009

(86) PCT No.: PCT/EP2009/051062

§ 371 (c)(1),
(2), (4) Date: Oct. 19, 2010

(87) PCT Pub. No.: WO2009/103605

PCT Pub. Date: Aug. 27, 2009

(65) Prior Publication Data

US 2011/0016696 A1 Jan. 27, 2011

(30) Foreign Application Priority Data

Feb. 19, 2008 (DE) ........................ 10 2008 010 083

(51) Int. Cl.

| | |
|---|---|
| ***B25B 27/02*** | (2006.01) |
| ***B23P 11/00*** | (2006.01) |
| ***B21D 37/10*** | (2006.01) |
| ***B21D 7/00*** | (2006.01) |

(52) U.S. Cl.
USPC ................ 29/525; 29/237; 29/281.3; 29/751; 29/753; 29/453; 72/416; 72/409.19; 72/409.12; 72/407; 72/452.8; 30/191

(58) Field of Classification Search
USPC ......... 29/525, 751, 753, 453; 72/407, 409.01, 72/409.12, 416, 452.8, 409.19; 30/191
See application file for complete search history.

(56) References Cited

U.S. PATENT DOCUMENTS 4,956,904 A 9/1990 Yamamoto et al.
5,025,546 A * 6/1991 Gotoh et al. .................... 29/508

FOREIGN PATENT DOCUMENTS

DE 2101476 12/1971
DE 2719882 11/1978

(Continued)

OTHER PUBLICATIONS

International Search Report for International Application No. PCT/EP2009/051062.

(Continued)

*Primary Examiner* — David Bryant
*Assistant Examiner* — Lawrence Burkart
(74) *Attorney, Agent, or Firm* — Proskauer Rose LLP

(57) ABSTRACT

The invention relates to a compression tool (2) for the permanent connection of workpieces (14, 16, 18, 30, 34) having two pivot elements (4), which each have a compression jaw (10), and having at least one rotational axis (6), on which the pivot elements (4) are hinged, wherein the inner contours of the opposing compression jaws (10) form a receiving area (12). The present invention is based on the technical problem of disclosing an alternative compression tool (2), with which a permanent connection can be provided between workpieces (14, 16, 18, 30, 34) by axial compression. The technical problem is solved in that the inner contours have at least one sliding face (22), which is inclined relative to the receiving area axis (20). A compression tool (2) can thus be provided which, starting from a radial inward movement, performs a compression in the axial direction, nonetheless requires little installation space, and offers weight advantages due to a smaller axial extension, for example. Furthermore, the invention relates to an attachment for a compression tool (2) and to a method for the permanent connection of workpieces using a compression tool.

4 Claims, 3 Drawing Sheets

(56) References Cited

FOREIGN PATENT DOCUMENTS

| | | |
|---|---|---|
| DE | 2725280 | 12/1978 |
| DE | 19840668 | 11/1999 |
| DE | 19906957 | 8/2000 |
| DE | 10144100 | 2/2003 |
| EP | 0343395 | 11/1989 |
| EP | 0870964 | 10/1998 |
| EP | 1547728 | 6/2005 |
| GB | 2 205 373 | 12/1988 |
| WO | 9717563 | 5/1997 |
| WO | 0012925 | 3/2000 |

OTHER PUBLICATIONS

English language translation of the abstract of DE 2719882, DE 2719882 is dated Nov. 2, 1978.

English language translation of the abstract of DE 2725280, DE 2725280 is dated Dec. 14, 1978.

* cited by examiner

METHOD FOR THE PERMANENT CONNECTION OF WORKPIECES, PRESSING TOOL, AND ATTACHMENT FOR A PRESSING TOOL

CROSS-REFERENCE TO RELATED APPLICATIONS

This application is a National Phase Application of International Application No. PCT/EP2009/051062, filed on Jan. 30, 2009, which claims the benefit of and priority to German Patent Application No. DE 10 2008 010 083.8-14, filed on Feb. 19, 2008. The disclosures of the above applications are incorporated herein by reference in their entirety.

FIELD OF THE INVENTION

The invention relates to a pressing tool for the permanent connection of workpieces, the pressing tool having two pivot elements which have a pressing jaw, and having at least one rotational axis on which the pivot elements are hinged, wherein the inner contours of the opposing pressing jaws form a receiving area. Furthermore, the invention relates to an attachment for a pressing tool having two pressing jaws, wherein each pressing jaw has an inner contour, and wherein the opposing inner contours of the pressing jaws form a receiving area. Further, the invention relates to a method for the permanent connection of workpieces using a pressing tool.

BACKGROUND

Pressing tools, attachments for pressing tools and methods of the above mentioned type are known, for example from the drinking water sector and heating installation sector. The tools and methods can be used to radially pressing together workpieces such as fittings, pipes, bushings or the like. To press together radially means here substantially to deform, by means of a tong-like closing movement of two pivot elements having pressing jaws, two workpieces which overlap one another at least partially and thus to connect them in a permanent manner.

However, this approach can be disadvantageous. With pressing tools and methods provided for this purpose, for example, it is made very difficult to apply an all-around homogeneous pressing force onto the workpieces to be pressed together. Pipes and fittings can have a rotation symmetric and essentially round shape prior to the pressing process. Due to inhomogeneously acting pressing forces, this symmetry can be disturbed at the joint between pipe and fitting after the pressing process, which on the one hand can affect the optical appearance and on the other hand the functionality of the connection.

Furthermore, the materials, in particular plastic or metals, of the workpieces loaded during the pressing process can have an inertia which is directed against the pressing forces. In the form of reset forces, this inertia can result in that the material deformed during the pressing process has the tendency to restore at least partially the initial state or the initial microstructure of the workpieces, respectively. This requires that the user of an inwardly acting pressing method or pressing tool, respectively, has to increase the pressing forces to be applied radially inwardly to obtain the desired pressing result. However, this represents a load on the materials of the workpieces to be pressed together which is beyond the usual level and thus is principally undesired.

SUMMARY OF THE INVENTION

The aforementioned problems can be solved or reduced by an axial pressing-together technique. A homogeneous application of force can be ensured in a significantly simpler manner with an axial pressing method. The reset properties of the materials to be deformed act principally also in axial direction. However, the implications of an increased load on the material can be kept low because of the axial extension of the workpieces which is usually long compared to the radial extension. However, axial acting pressing tools can require a wide installation space and have a high weight. The use of such tools or the use of such methods, respectively, is thus made difficult for the installer.

In various aspect, the invention provides pressing tool, an attachment for a pressing tool or a method, respectively, by means of which a permanent connection between workpieces can be provided by axial pressing-together.

A pressing tool for the permanent connection of workpieces can comprise two pivot elements which each have a pressing jaw, and at least one rotational axis on which the pivot elements are hinged, wherein the inner contours of the opposing pressing jaws form a receiving area, in that the inner contours have at least one slide face which is inclined relative to the receiving area axis.

The receiving area axis extends approximately perpendicular to the face between the inner contours of the pressing jaws and corresponds substantially coaxial to the axis of a workpiece, for example a pipe or fitting, which is inserted into the receiving area for the purpose of being pressed together.

By the slide face inclined against the receiving area axis, the dynamic of a radially inwardly performed movement can be transformed at least partially into a pressing force extending in axial direction. During the pressing process, the pivot elements and in particular the pressing jaws are moved about the rotational axis and towards each other while the workpieces to be pressed together are arranged in the receiving area between the pressing jaws. The inner contours of the pressing jaws are brought into abutment against faces arranged on the workpiece to be pressed together. By continuing the radially inward movement, the area remaining between the workpieces and the inner contours is narrowed. The slide faces abutting against the workpieces act thus as force transmission faces and force deflection faces because the slide face and the face on the workpiece slide about one another while the workpiece is set in motion. In this manner, although starting with a radially inward movement, a relative movement can be generated in axial direction between the workpieces to be pressed together and can be used for the pressing-together.

As a result, a pressing tool can be provided which performs a pressing-together in axial direction, nonetheless requires little installation space and, for example, offers weight advantages due to a smaller axial extension.

It is possible to provide the inner contour of each pressing jaw with exactly one slide face. However, in this case, the inner contour has in a preferred manner also a projection which acts as counter support and which is arranged opposite to the slide face on the other side of the inner contour of the pressing jaw. This projection can engage behind a section of a workpiece to be pressed together, in particular the workpiece which is not in contact with the slide face, and thus can build up the counter pressure necessary for the axial pressing-together. A force deflection from a radially inward into an axial direction is not effected by the projection, however.

It is also possible to provide two slide faces which face one another and which are inclined relative to the receiving area axis. In this manner, the force which is deflected and used for the axial pressing-together can be increased. In a symmetrical configuration of the two slide faces and adequate interaction faces on the workpieces, the deflected pressing force is doubled, for example. However, it is to be noted that the configuration of the two slide faces do not have to correspond to each other or do not have to be symmetrically to each other but can also be configured differently if it is helpful for the use.

In one embodiment, at least one slide face is formed as a cone segment. In this manner, in particular the production of the inner contours of the pressing jaws and, if applicable, the production of workpieces having interaction faces adapted to said pressing jaws, which are provided for the above described type of pressing-together, are simplified. Thereby, a high degree of compatibility between the above described pressing tools and the work pieces to be pressed-together such as pipes, fittings and the like can be achieved.

Preferably, the inclination angle of the slide face lies between 35° and 55°, in particular 45°, relative to the receiving area axis. The inclination angle determines substantially the distance to be covered by the radially inward movement to cause an axial movement over a certain distance. The smaller the inclination angle, the further the inner contour of the pressing jaw has to reach out in axial direction to achieve a certain pressing result, whereas the radial extension of the pressing jaw can be dimensioned fairly narrow. An angle of, for example, 35° thus results in a fairly efficient force deflection coming out of the radial movement, whereas an angle of 55° results in a longer radial path but in return ensures a higher stability during the pressing-together. The angle of 45° in turn is particularly suitable to provide a balance between the two effects. Moreover, the outer dimensions of the pressing jaws can be optimized in this manner in radial as well as in axial direction.

It is further particularly preferred that the slide face is configured in a slide-promoting manner. In this manner, the inertia by means of which the workpieces to be pressed together oppose an axial displacement movement can at least be reduced so that the pressing process is easier to carry out. To configure the slide face in a slide-promoting manner can take place in different ways. It is possible to form the section of the inner contour of the pressing jaw comprising the slide face together with the rest of the pressing jaw as two pieces and to make the slide face from a material such as polytetrafluoroethylene or the like. However, it is also possible to increase the sliding properties by means of a slide-promoting coating on the slide faces, for example a slide lacquer coating. It is also possible to form the slide face in a slide-promoting manner by smoothening the slide face, for example by polishing the slide face.

According to a further teaching of the present invention, an attachment for a pressing tool can have two pressing jaws, wherein each pressing jaw has an inner contour and wherein the opposing inner contours of the pressing jaws form a receiving area, in that the inner contours comprise at least one slide face inclined relative to the receiving area axis.

In this manner, tools which were originally provided for the radial pressing-together can be made suitable in a simple manner for an axial pressing-together. The reproduction of pivot elements which are adapted to the changed requirements is thus no longer necessary which results in particular in economical advantages.

According to a further teaching of the present invention, a method for the permanent connection of workpieces ca use a pressing tool in particular as described above, wherein the pressing tool is actuated radially inwardly, wherein at least one slide face arranged on the pressing tool and inclined relative to the workpiece axis and one workpiece face are brought into abutment against one another, wherein the radially inwardly exerted pressing force is transferred from the slide face onto the workpiece face and is deflected at least partially in axial direction, and wherein the workpieces are pressed together in axial direction.

Preferably, the slide face faces a correspondingly adapted workpiece face. Thereby, in particular, a larger contact face between slide face and workpiece face is provided. In this manner, for example, the stability of the pressing process can be increased.

Further advantages of the pressing tools, attachments for pressing tools, and methods for using the same according to the invention will be understood by those of ordinary skill in the art from the specification and drawings.

BRIEF DESCRIPTION OF THE DRAWINGS

The invention is explained hereinafter in more detail by means of exemplary embodiments illustrated in a drawing. In the figures.

DETAILED DESCRIPTION

Figure 1B:
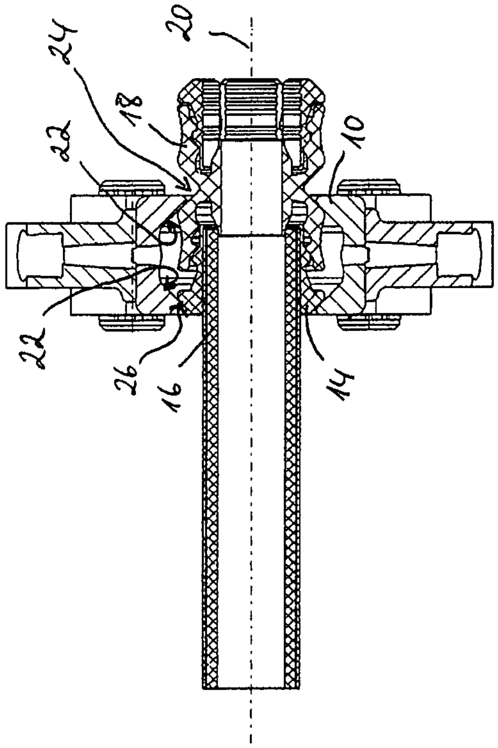
FIGS. 1*a, b* show an exemplary embodiment of the pressing tool prior to the pressing process in two different views, FIGS. 2*a, b* show the exemplary embodiment of the pressing tool of FIGS. 1*a, b* after the pressing process in two different views.
Figure 1A:
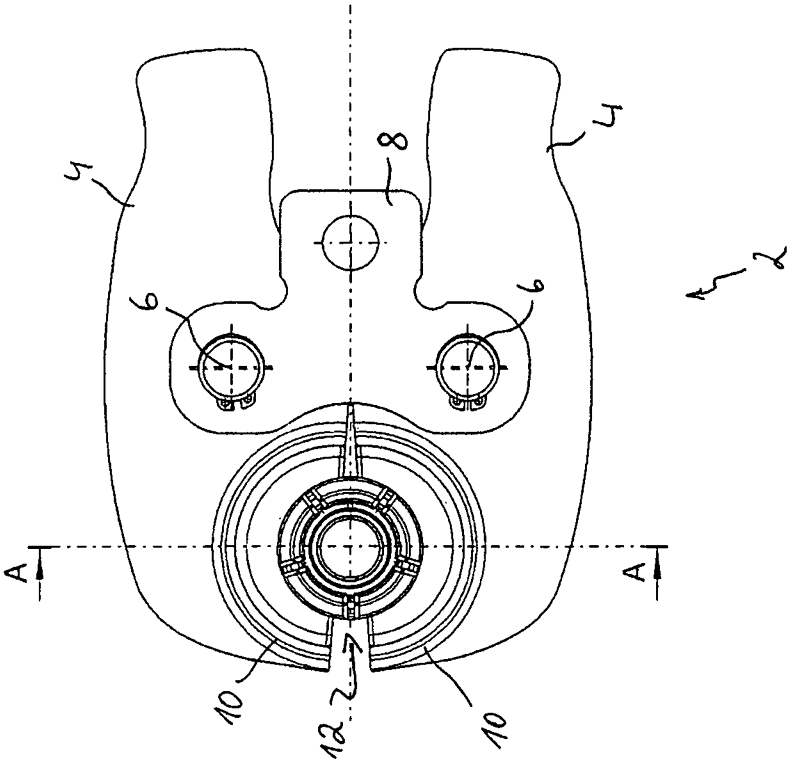

FIG. 1*a* shows a pressing tool 2 in a side view. The pressing tool 2 has two pivot elements 4 which can be pivoted about a rotational axis 6 which is assigned to each of them. By providing two rotational axes 6, the pivot movements of the pivot elements 4 can be configured more flexible. However, the provision of only one rotational axis 6 on which both pivot elements are hinged is also possible. In this example, the pivot elements 4 are connected to each other through the carrier elements 8 which are assigned to the pivot elements 4. On one section of the pivot elements 4, pressing jaws 10 are arranged which are opposing and which form a receiving area 12 therebetween by means of their inner contours. Depending on the position of the pivot elements 4 relative to one another, the receiving area 12 can be kept wider or narrower. In this exemplary embodiment, a pipe end 16 encompassed by a sleeve 14, and a fitting 18, which are particularly suitable for an axial pressing-together, are inserted into the receiving area 12. The sleeve 14 is connected to the pipe 16 through fixing projections (not shown) arranged on the inner circumferential face of the sleeve 14 which are anchored in the outer circumferential face of the pipe 16 so that the sleeve 14 and the pipe 16 cannot be moved relative to one another.

Hereinafter, the pressing process is described. Of course, the pressing tool 2 or the method according to the invention is not limited to the use of the pipes 16, sleeves 14 or fittings 18 which are exemplary illustrated here.

The pivot elements 4 exemplary shown here can also be provided with removable pressing jaws 10. In this manner, already fabricated pressing tools 2 which were originally designated for a radial pressing can be made suitable also for an axial pressing by means of an attachment for a pressing tool 2 according to the invention.

FIG. 1*b* shows in a cross-sectional view of the arrangement of FIG. 1*a* a fitting 18, a sleeve 14, and a pipe 16 prior to the permanent connection between these three workpieces 14, 16, 18 is being produced.

In this example, the inner contours of the pressing jaws 10 have two slide faces 22 which are inclined relative to the receiving area axis 20 and which are facing one another. The slide faces are separated by a generally cylindrical face. In this example, both slide faces 22 are formed as cone segments. However, other shapes are also conceivable. In particular, the inclination angle of the slide faces 22 is freely selectable. In this example, however, the inclination angle of the slide faces 22 relative to the receiving area axis 20 is constant at approximately 45°. However, deviations from this value, for example 35° or 55° or, if applicable, beyond are also possible. The slide faces 22 can be configured in a slide-promoting manner by means of a coating, which is not illustrated in this exemplary embodiment.

Central on its base body, the fitting 18 has a recess 24 with beveled side walls. The inclination angle of the side walls in this example is advantageously adapted to the inclination angle of the slide faces 22 on the pressing jaws 10. Further, the sleeve 14 has a chamfer 26 on its flange-like projection, which chamfer is also adapted to the inclination angle of the slide faces 22, thus approximately 45° in this example. In this manner, the pressing process can in particular be stabilized. Prior to the pressing process, the slide faces 22 abut against the aforementioned workpiece faces, for example the chamfer 26 of the sleeve 14 or the side wall of the recess 24 of the fitting 18.

Figure 2B:
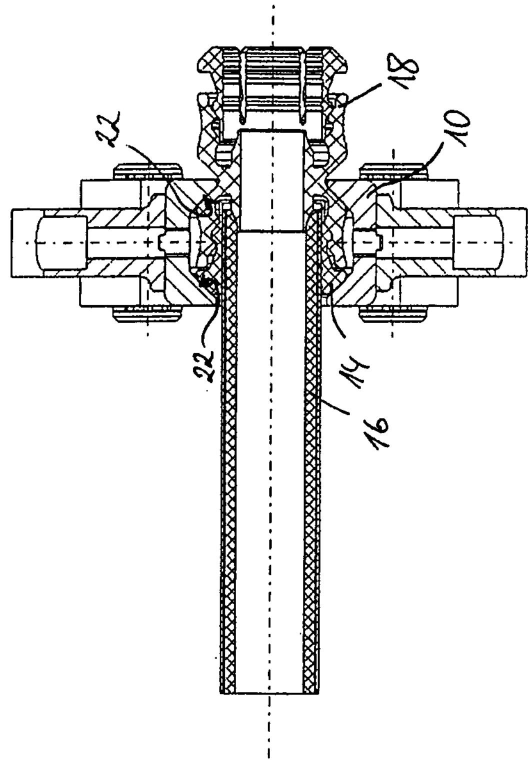
Figure 2A:
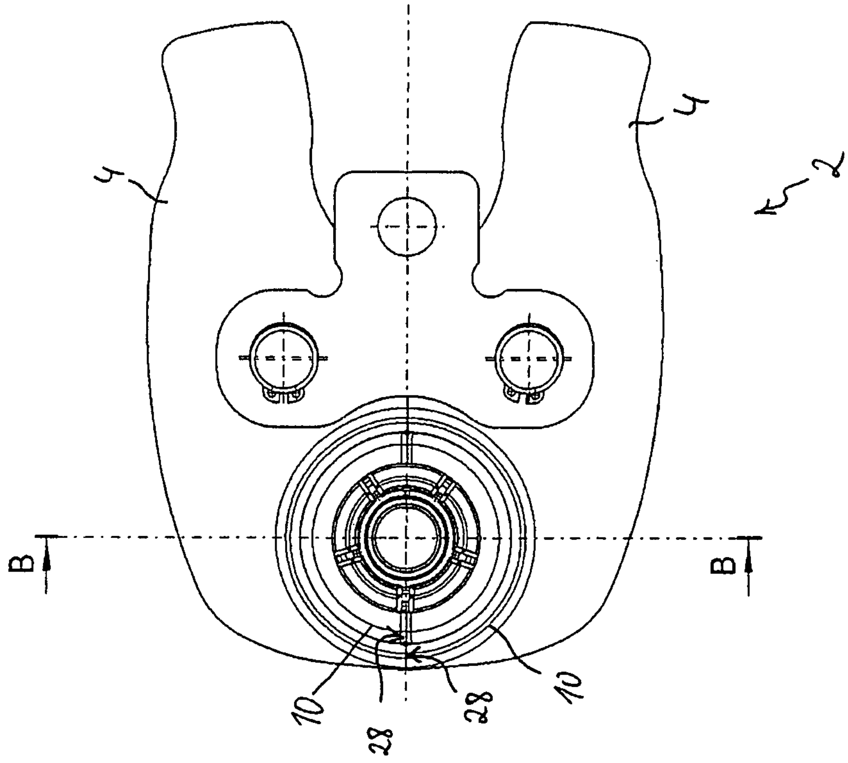

FIG. 2*a* shows the state of the pressing tool 2 and the workpieces 14, 16, 18 after the pressing process in a side view. The pivot elements 4 are pivoted inwardly so that the joint faces 28 of the pressing jaws 10 abut against one another.

FIG. 2*b* illustrates the arrangement of FIG. 2*a* in a cross-sectional view. Through the radially inward movement of the pressing jaws 10, the exerted force has been transferred at least partially via the slide faces 22 and workpiece faces, which abut against one another, from the pressing tool 2 to the workpieces, in this example the sleeve 14 and the fitting 18, and thereby deflected in the axial direction. This results in that, in this example, the sleeve 14 and the pipe 16 connected to the sleeve 14 as well as the fitting 18 move towards each other or, in other words, are compressed or pressed together.

After the axial pressing process, a locking projection arranged on the outer circumferential face of the sleeve 14 is locked in place in a locking groove 18 arranged on the inner circumferential face of the outer body of the fitting 18 so that an axial removal of the pipe end 16 encompassed by the sleeve 14 out of the fitting 18 is not possible.

The permanent connection is thereby generated. An axial movement of the pipe 16 out of the fitting 18 is prevented by the locking. The support body of the fitting 18 was partially formed into the inner circumferential face of the pipe 16 during the pressing process and thus seals the connection between pipe 16 and fitting 18 for example against pressurized fluids (not illustrated) conveyed in the pipe 16.

As a result, a pressing tool 2 has been used which, despite radial starting movement of the pressing jaws 10, performs a pressing-together in axial direction, requires little installation space, and offers in particular an improved handling.

Figure 3:
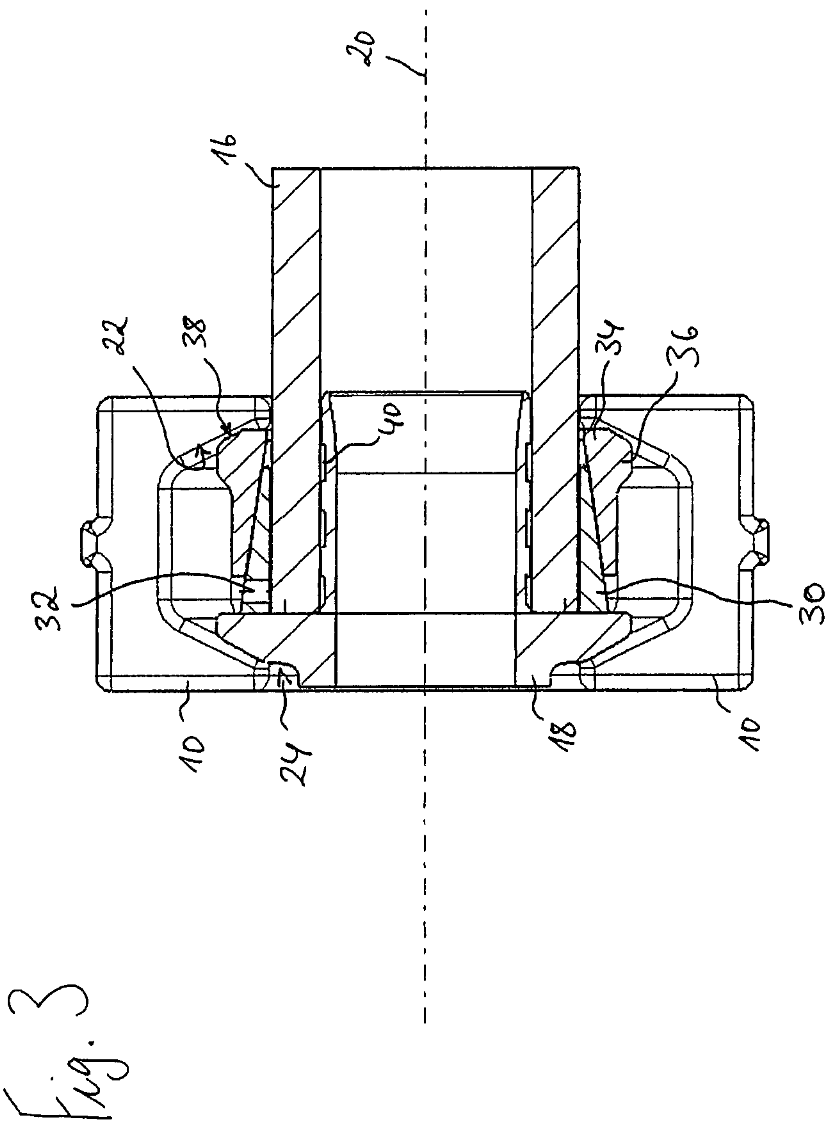
FIG. 3 shows a further exemplary embodiment of the use of a pressing tool according to the invention.

FIG. 3 shows in a cross-sectional view an arrangement from a pipe 16, a fitting 18 having a support body, wherein the support body engages with the pipe 16, a transmission element 30 arranged on the outer circumferential face of the pipe, which transmission element has a wedge-shaped cross-section and, at the wider end of the wedge, an opening 32 for visual inspection of the pressing state, and a slide sleeve 34 abutting on the outside of the transmission element 30, which slide sleeve has also an approximately wedge-shaped cross-section but has a flange-like projection 36 at the wider end. The flange-like projection 36 of the slide sleeve 34 has a chamfer 38, the face of which is provided for interaction with one of the slide faces 22 of the pressing jaws 10 which are schematically illustrated in this example. The slide sleeve 34 too has an opening for visual inspection of the pressing state of the workpieces 16, 18, 30 and 34. On its base body, the fitting 18 has a recess 24 with a beveled wall face, wherein the inclination of the beveled wall face is adapted to the inner contour of the pressing jaws 10.

The pressing jaws 10 comprise in this example two slide faces 22 which face one another and which are configured as cone segments, and which have an inclination angle relative to the receiving area axis 20 of approximately 60°. By selecting this slightly greater angle, in particular the stability of the pressing process can be improved.

During the pressing process, the slide faces 22 of the pressing jaws 10 interact with the beveled wall faces at the recess 24 of the fitting 18 and with the chamfer 38 of the flange-like projection 36 of the slide sleeve 34. The dynamic generated by a radially inward movement of the pressing jaws 10 is transmitted via the slide faces 22 to the slide sleeve 34 and the fitting 18 so that the fitting 18, the slide sleeve 34 and thus also the transmission element 30 can be pushed together in axial direction. The wedge-shaped configuration of the slide sleeve 34 and the transmission element 30 as well as their abutment have the effect that the pressing forces are transmitted onto the outer circumferential face of the pipe during the pressing process and are at least partially deflected again in radially inward direction. Thereby, the pipe 16 is pressed together with the support body of the fitting 18, wherein material of the pipe 16 is formed in particular into recesses 40 arranged on the outer circumferential face of the support body so that an axial movement after completion of the pressing process is prevented. In this manner, thus, a permanent connection between a pipe 16 and a fitting 18 can be provided, as well.

The invention claimed is:

1. A pressing tool for compressing work pieces, wherein the workpieces define an axis, the work pieces can be compresses in an axial direction, and an axial compressing force is produced by a radial inwardly-performed movement of the pressing tool, the pressing tool comprising:

two pivot elements, each having one pressing jaw, and at least one rotational axis on which the pivot elements are hinged, wherein the pressing jaws have inner contours to be brought into abutment against faces arranged on the work pieces to be axially pressed together, the inner contours of the opposing pressing jaws form a receiving area, for receiving the work pieces, the receiving area having a receiving axis substantially coaxial with the axis of the work pieces, the inner contours have two opposing slide faces inclined relative to the receiving area axis, said slide faces being separated by a generally semi-cylindrical face, and wherein each slide face has an inclination angle relative to the receiving area axis, and the inclination angle of each slide face lies between 35° and 60° relative to the receiving area axis.

2. The pressing tool of claim 1, wherein at least one slide face is formed as a cone segment.

3. The pressing tool of claim 1 wherein the inclination angle of the slide face lies between 45° and 55° relative to the receiving area axis.

4. The pressing tool of claim 1, wherein the slide face is configured in a slide-promoting manner.

* * * * *

UNITED STATES PATENT AND TRADEMARK OFFICE

CERTIFICATE OF CORRECTION

PATENT NO. : 8,567,034 B2
APPLICATION NO. : 12/735865
DATED : October 29, 2013
INVENTOR(S) : Frank Hofmann, Sudi Sinoplu and Andreas Hütte It is certified that error appears in the above-identified patent and that said Letters Patent is hereby corrected as shown below:

In the Claims

At Column 6, line 36, Claim 1, amend “the workpieces” to --the work pieces--

Signed and Sealed this
Fourth Day of February, 2014

Michelle K. Lee
*Deputy Director of the United States Patent and Trademark Office*